US010252687B1

(12) United States Patent
Tippy

(10) Patent No.: US 10,252,687 B1
(45) Date of Patent: Apr. 9, 2019

(54) VEHICLE SIDE IMPACT DETECTION

(71) Applicant: Ford Global Technologies, LLC, Dearborn, MI (US)

(72) Inventor: David James Tippy, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/899,182

(22) Filed: Feb. 19, 2018

(51) Int. Cl.
*B60R 21/0136* (2006.01)
*B60R 21/01* (2006.01)
*B60R 21/00* (2006.01)

(52) U.S. Cl.
CPC .. *B60R 21/0136* (2013.01); *B60R 2021/0009* (2013.01); *B60R 2021/01013* (2013.01); *B60R 2021/0117* (2013.01)

(58) Field of Classification Search
CPC ... B60R 21/01; B60R 21/0136; B60R 21/343; B60R 21/01516
USPC ...... 340/436, 438; 280/728.1, 730.1; 701/45
See application file for complete search history.

(56) References Cited

U.S. PATENT DOCUMENTS

| 7,605,691 | B2 | 10/2009 | Nonaka et al. |
| 8,412,415 | B2 | 4/2013 | Metzler |
| 8,844,968 | B2 | 9/2014 | Giesler et al. |
| 2005/0218632 | A1* | 10/2005 | Cuevas ................ B60R 21/268 280/730.1 |
| 2017/0072795 | A1* | 3/2017 | Ghannam ............. B60K 35/00 |
| 2018/0056911 | A1* | 3/2018 | Demirovic ............. B60R 21/01 |

FOREIGN PATENT DOCUMENTS

| DE | 19602990 B4 | 10/2005 |
| KR | 100837388 B2 | 6/2008 |
| KR | 100887684 B1 | 3/2009 |

* cited by examiner

*Primary Examiner* — Hung T Nguyen
(74) *Attorney, Agent, or Firm* — Frank A. MacKenzie; Bejin Bieneman PLC

(57) ABSTRACT

A vehicle includes an instrument panel, a pressure sensor, and a door. The instrument panel defines a sensor cavity and a first opening in fluid communication with the sensor cavity. The pressure sensor is in the sensor cavity. The door defines a door cavity and a second opening in fluid communication with the door cavity. The door is moveable between an open position and a closed position. The first and second openings are engaged with each other in the closed position and disengaged with each other in the open position.

20 Claims, 7 Drawing Sheets

VEHICLE SIDE IMPACT DETECTION

BACKGROUND

Vehicles may include a plurality of sensors installed in the vehicle to detect an impact or collision of the vehicle. The sensors may be pressure sensors that measure pressure data in a location of the vehicle. The vehicle may include a computer in direct communication, e.g., by wire, with the pressure sensor to obtain the pressure data. The computer may detect a vehicle impact based on the pressure data.

DETAILED DESCRIPTION

Figure 1:
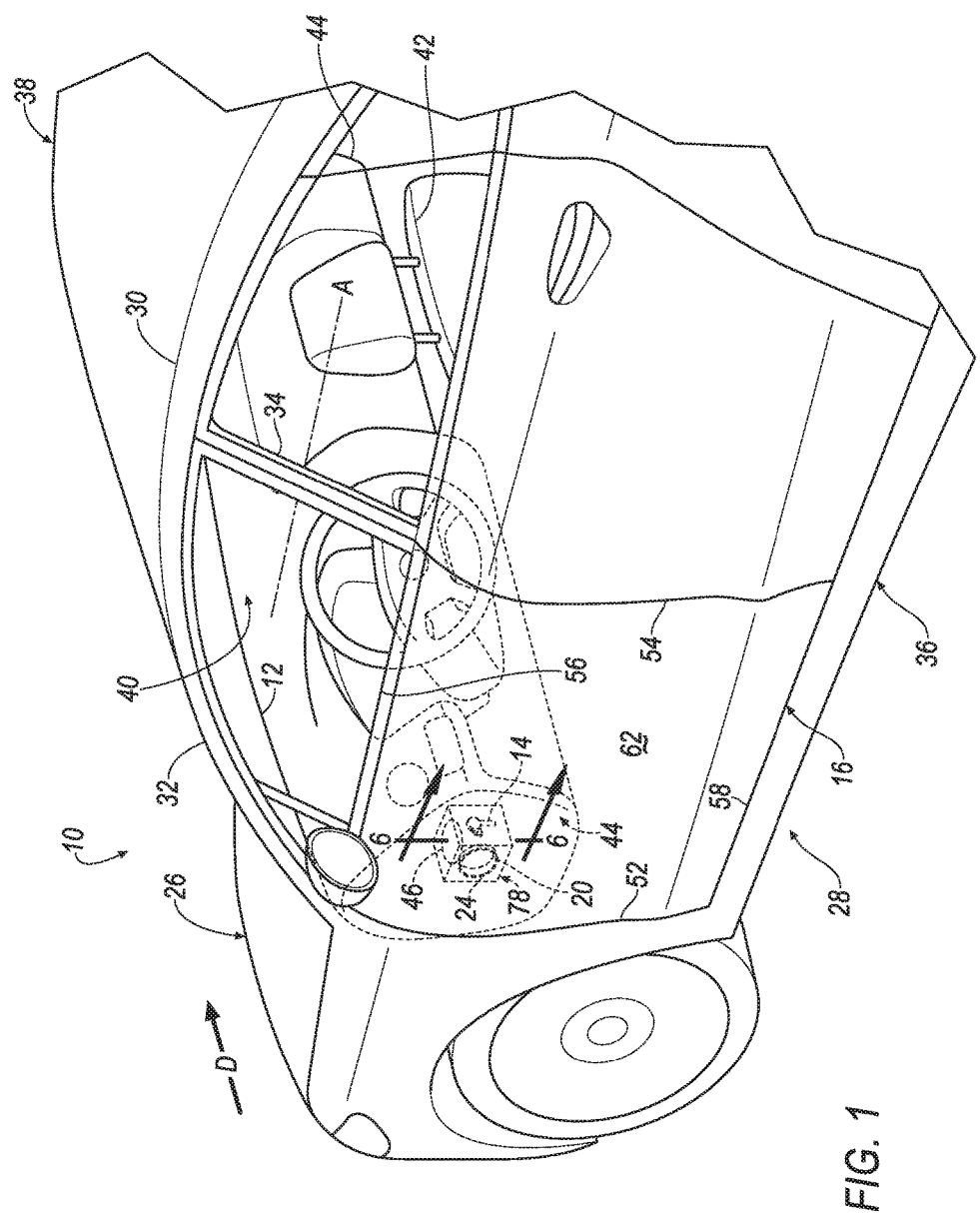
FIG. 1 is a perspective view of a vehicle including a door in a closed position.

A vehicle includes an instrument panel defining a sensor cavity and a first opening in fluid communication with the sensor cavity, a pressure sensor in the sensor cavity, and a door defining a door cavity and a second opening in fluid communication with the door cavity. The door is moveable between an open position and a closed position. The first and second openings are engaged with each other in the closed position and disengaged with each other in the open position.

The sensor cavity may be sealed except at the first opening.

The sensor cavity may be in fluid communication with the door cavity through the first and second openings when the door is in the closed position.

The vehicle may include a seal engaged with each of the first and second openings when the door is in the closed position. The seal may extend annularly about each of the first and second openings.

The seal may be sandwiched between the instrument panel and the door when the door is in the closed position.

The first opening may include a shutter moveable between a first position and a second position. The shutter may extend entirely across the first opening in the first position.

The shutter may prevent fluid communication with the sensor cavity through the first opening when the shutter is in the first position.

The shutter may allow fluid communication with the sensor cavity through the first opening when the shutter is in the second position.

The vehicle may include a controller in communication with the pressure sensor. The controller may be programmed to disable the pressure sensor when the door is in the open position.

The vehicle may include an airbag inflatable to an inflated position. The controller may be further programmed to inflate the airbag to the inflated position in response to a signal from the pressure sensor indicating a vehicle side impact when the door is in the closed position.

The first opening may include a shutter moveable between a first position and a second position. The controller may be further programmed to move the shutter in response to the door moving between the open position and the closed position.

The door may be removeable.

The vehicle may include a controller in communication with the pressure sensor. The controller may be programmed to disable the pressure sensor when the door is removed.

The vehicle may include an airbag inflatable to an inflated position. The controller may be further programmed to inflate the airbag to the inflated position in response to a signal from a secondary sensor indicating a vehicle side impact when the door is removed.

The first opening may include a shutter moveable between a first position and a second position. The controller may be further programmed to move the shutter in response to the door being removed.

A method includes determining that a door of a vehicle is in an open position, and disabling a pressure sensor in an instrument panel of the vehicle as a result of determining that the door is in the open position.

The method may include moving a shutter to a first position as a result of determining the door is in the open position.

The method may include moving the shutter to a second position as a result of determining the door is in a closed position.

The door may be removeable. The method may include disabling the pressure sensor as a result of determining the door is removed from the vehicle.

The method may include enabling the pressure sensor as a result of determining the door is installed on the vehicle and in the closed position.

Figure 2:
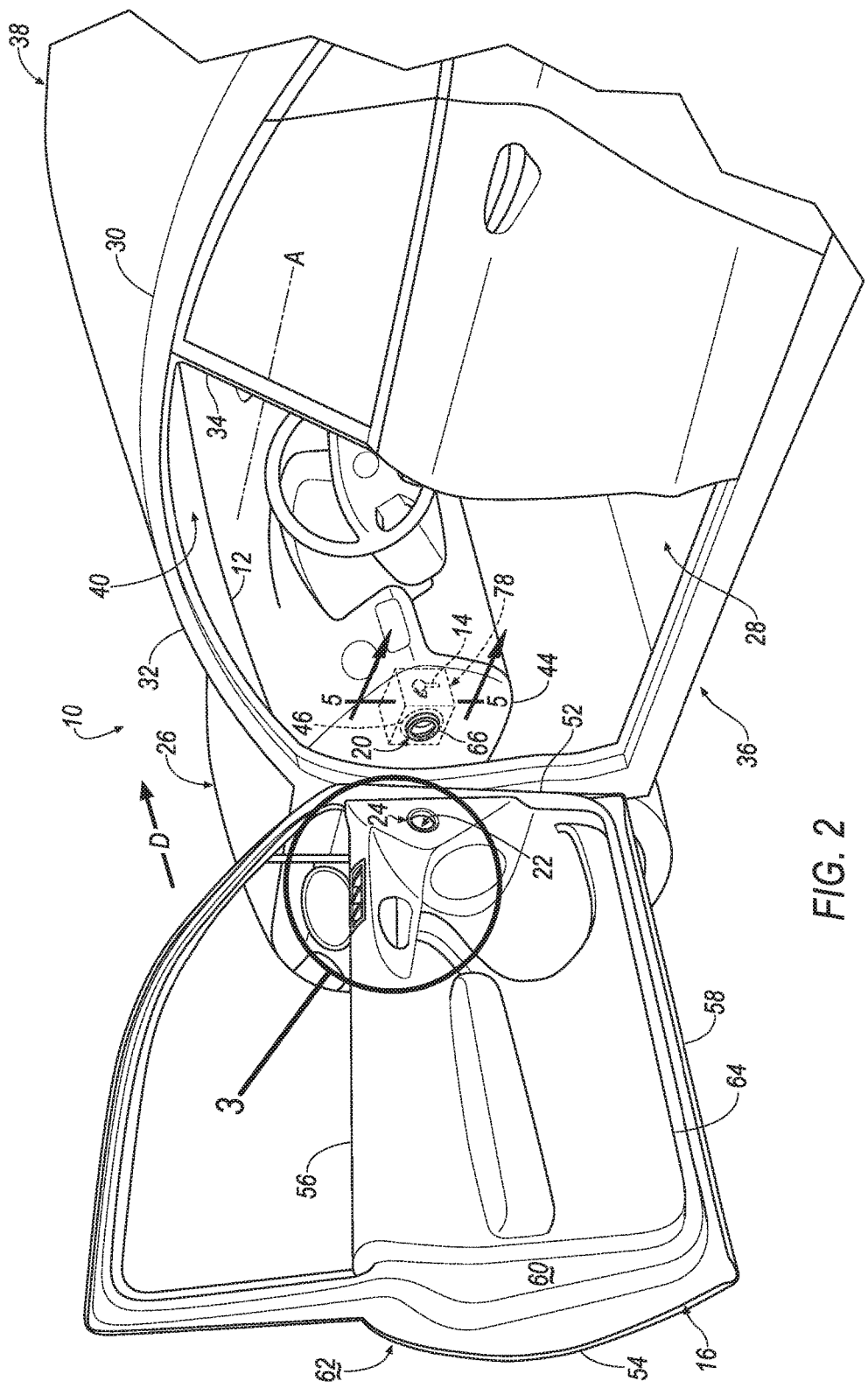
FIG. 2 is a perspective view of the vehicle including the door in an open position.

With reference to the Figures, wherein like numerals indicate like parts throughout the several views, a vehicle 10 is generally shown. The vehicle 10 includes an instrument panel 12 having a pressure sensor 14 and a door 16 adjacent the instrument panel 12. Specifically, the instrument panel 12 may define a sensor cavity 18 and a first opening 20 in fluid communication with the sensor cavity 18. The pressure sensor 14 may be in the sensor cavity 18. The door 16 may define a door cavity 22 and a second opening 24 in fluid communication with the door cavity 22. The door 16 may be moveable between a closed position, as shown in FIG. 1, and an open position, as shown in FIG. 2. The first and second openings 20, 24 may be engaged with each other in the closed position and disengaged with each other in the open position.

During a vehicle impact, e.g., a side impact, the door 16 may be impacted and intrude toward an occupant. In this situation, the pressure inside the door 16 may be increased due to deformation of the door 16. When the pressure increases, a pressure pulse may move from the door 16 to the instrument panel 12. Specifically, the pressure pulse may move from the the door cavity 22 through the second opening 24 and the first opening 20 to the sensor cavity 18 of the instrument panel 12. When the pressure pulse enters the sensor cavity 18 of the instrument panel 12, the pressure sensor 14 collects the pressure data of the pressure pulse to detect the side impact. By allowing the door cavity 22 to be in fluid communication with the sensor cavity 18 through the first opening 20 and the second opening 24, the pressure sensor 14 may detect the side impact while being disposed in the instrument panel 12.

The vehicle 10 may, for example, be any suitable type of automobile. The vehicle 10 may include a vehicle body 26 defining at least one door opening 28, as shown in FIG. 1. The vehicle body 26 may include a roof 30 and a plurality of pillars 32, 34. The pillars 32, 34 may be spaced from each other by the door opening 28. In other words, the pillars 32, 34 may be disposed on opposite sides of the door opening 28. For example, the pillars 32, 34 may include an A-pillar 32 and a B-pillar 34 spaced from the A-pillar 32 on the opposite side of the door opening 28. The pillars 32, 34 may include additional pillars, e.g., a C-pillar (not numbered).

With reference to FIG. 1, the vehicle 10 may include two sides 36, 38 spaced from each other in a cross-vehicle direction D. The sides 36, 38 of the vehicle 10 may be elongated along a longitudinal axis A transverse to the cross-vehicle direction D. Each side 36, 38 of the vehicle 10 may be similar or identical to each other. For example, as shown in the Figures, each side 36, 38 includes one A-pillar 32, one B-pillar 34, at least one door opening 28, and at least one door 16. Common numerals are used to identify common features on each side 36, 38 of the vehicle 10. The two sides 36, 38 of the vehicle 10 may be mirror images of each other about the longitudinal axis A of the vehicle 10, as shown in the Figures.

With continued reference to FIG. 1, the vehicle body 26 may define a passenger cabin 40 to house occupants, if any, of the vehicle 10. One or more seats (not numbered) may be disposed at a front (not numbered) of the passenger cabin 40, e.g., between the A-pillar 32 and the B-pillar 34. In this situation, the seats may be front seats 42. The passenger cabin 40 may include one or more rear seats (not shown) disposed behind the front seats 42. The passenger cabin 40 may also include third-row seats (not shown) at a rear (not shown) of the passenger cabin 40, in which case the seats may be second-row seats (not numbered) instead of or in addition to being front seats 42. As shown in FIG. 1, the seat is a bucket seat, but the seat may be other suitable types of seat, e.g., a bench seat.

The instrument panel 12 may extend across the passenger cabin 40 from one side 36 to the other side 38 of the vehicle 10, i.e., in the cross-vehicle direction D, as shown in FIG. 2. The instrument panel 12 may be disposed at the front of the passenger cabin 40 and face toward front seats 42. In other words, the instrument panel 12 may be disposed adjacent to the A-pillar 32 on each side 36, 38 of the vehicle 10. The instrument panel 12 may include vehicle controls, including a steering wheel.

With reference to FIG. 2, the instrument panel 12 may include an end cap 44 adjacent to each A-pillar 32. In other words, one end cap 44 may be on one side 36 of the vehicle 10 and another end cap 44 may be on the other side 38 of the vehicle 10. The vehicle 10 may include one sensor cavity 18 adjacent to each end cap 44. In other words, the vehicle 10 may include one sensor cavity 18 on each side 36, 38 of the vehicle 10. The end cap 44 may partially define the sensor cavity 18. For example, the sensor cavity 18 may extend from the end cap 44 into the instrument panel 12, as set forth further below. The end cap 44 may be disposed between the pressure sensor 14 and the door 16 on each side 36, 38 of the vehicle 10.

With continued reference to FIG. 2, the first opening 20 may be disposed in the end cap 44. In other words, the first opening 20 may extend through the end cap 44 to the sensor cavity 18. The first opening 20 may be any suitable shape, e.g., circular, rectangular, etc. The first opening 20 may have any suitable size, i.e., cross-sectional area. In other words, the first opening 20 may extend transverse to the cross-vehicle direction D any suitable amount along the end cap 44.

Figure 5:
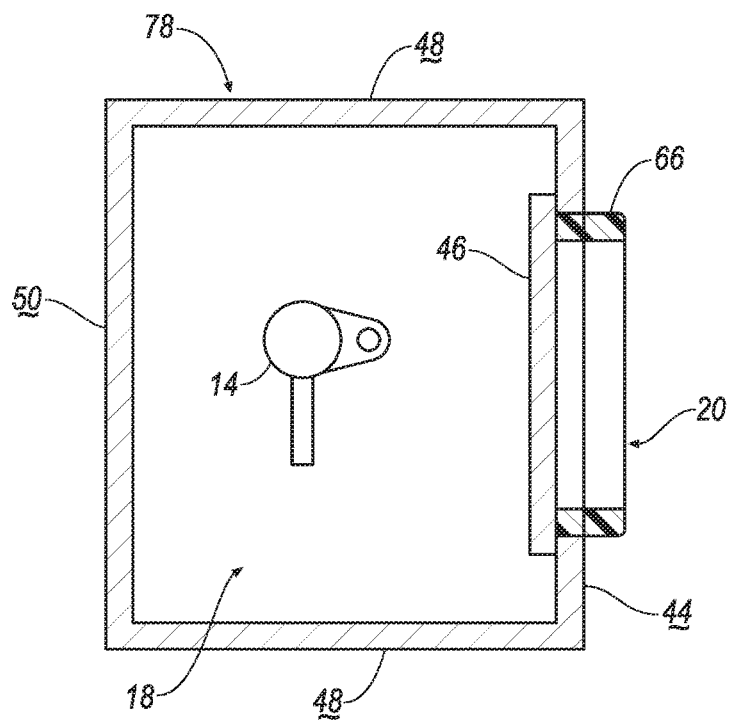
FIG. 5 is a cross-sectional view along line 5 in FIG. 2 of the first opening including a shutter in a first position.
Figure 6:
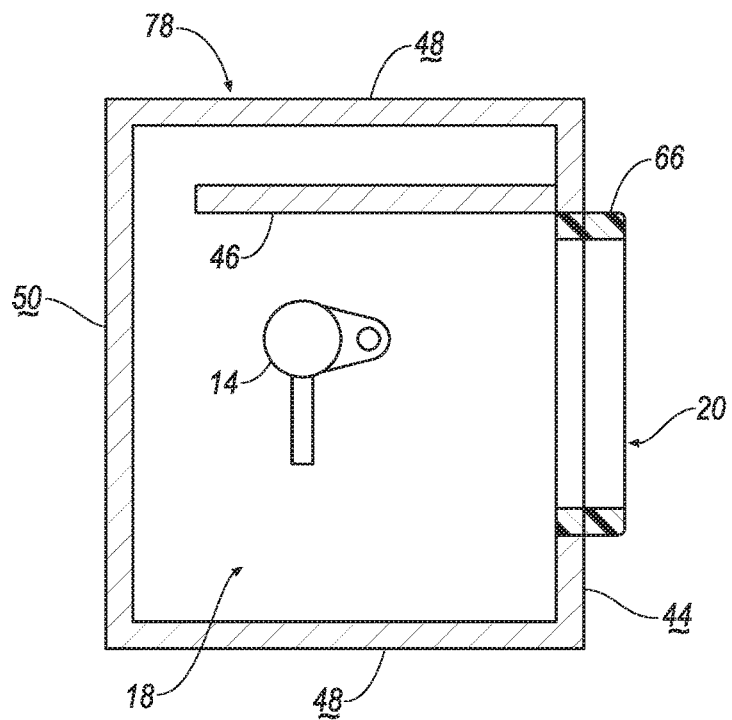
FIG. 6 is a cross-sectional view along line 6 in FIG. 1 showing the shutter in a second position.

The first opening 20 may include a shutter 46 moveable between a first position, as shown in FIG. 5, and a second position, as shown in FIG. 6. In the first position, the shutter 46 extends entirely across the first opening 20, i.e., the shutter 46 covers the first opening 20, as shown in FIG. 5. The shutter 46 may, for example, extend transverse to the cross-vehicle direction D. In the first position, the shutter 46 may seal the sensor cavity 18. In other words, the shutter 46 may prevent fluid communication through the first opening 20 in the first position. By sealing the first opening 20, the shutter 46 may prevent debris, water, and other contaminants from entering the sensor cavity 18. In the first position, the shutter 46 may prevent pressure pulses from entering the sensor cavity 18. In other words, the shutter 46 may prevent the pressure sensor 14 from detecting pressure pulses in the sensor cavity 18.

In the second position, the shutter 46 allows fluid communication with the sensor cavity 18 through the first opening 20. For example, the shutter 46 may be spaced from the first opening 20 such that the first opening 20 is unobstructed by the shutter 46, as shown in FIG. 6. In other words, fluid may flow through the entire first opening 20 unobstructed by the shutter 46. As another example, the shutter 46 may extend partially across the first opening 20. In this situation, the shutter 46 may reduce the size, e.g., the cross-sectional area, of the first opening 20 that allows fluid communication with the sensor cavity 18. The shutter 46 may be used to control the amount of fluid flowing through the first opening 20 by controlling the amount of obstruction of the first opening 20.

Figure 4:
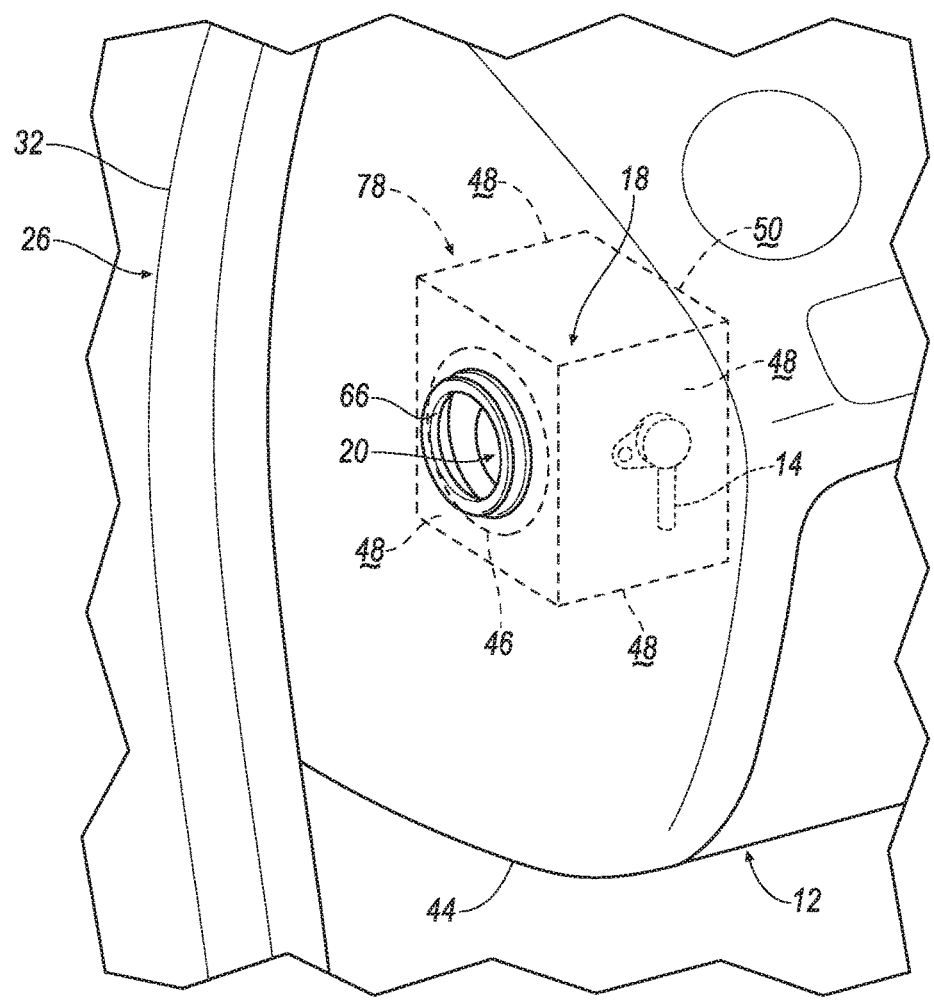
FIG. 4 is a perspective view of the vehicle including an instrument panel having a pressure sensor and a first opening disposed adjacent the pressure sensor.

The shutter 46 may have any suitable shape, e.g., circle, square, rectangle, etc. The shutter 46 may be larger than the first opening 20, as shown in FIG. 4. In other words, the shutter 46 may have a larger area than the cross-sectional area of the first opening 20. Alternatively, the shutter 46 may be the same size as the first opening 20. In other words, the shutter 46 may have the same area as the cross-sectional area of the first opening 20. The shutter 46 may be formed of any suitable material, e.g., plastic, rubber, metal, etc.

The shutter 46 may be attached to the end cap 44 in any suitable manner. For example, the shutter 46 may be attached directly to the end cap 44 or indirectly to the end cap 44 through an intermediate component. The shutter 46 may, for example, be hingedly attached to the end cap 44 adjacent the first opening 20. In this situation, the shutter 46 may pivot between the first position and the second position, as shown in FIGS. 1 and 4. As another example, the shutter 46 may be slideably engaged with a track extending transverse to the cross-vehicle direction D. In this situation, the shutter 46 may slide between the first position and the second position. As another yet example, the shutter 46 may be hingedly attached to the first opening 20. In this situation, the shutter 46 may pivot axially across the first opening 20, e.g., along a diameter of the first opening 20, between the first position and the second position.

The shutter 46 may include a motor (not shown). The motor may move the shutter 46 between the first position and the second position. The motor may be any suitable type of motor, e.g., an electric motor.

With reference to FIG. 4, the sensor cavity 18 may be sealed except at the first opening 20. For example, the instrument panel 12 may include an enclosure 78 that surrounds the sensor cavity 18 except at the first opening 20. The enclosure 78 prevents fluid communication between the sensor cavity 18 and the ambient environment.

The enclosure 78 may include a plurality of sides 48 extending from the end cap 44 to an interior side 50 disposed between the end cap 44 and the longitudinal axis A of the vehicle 10. In other words, the sensor cavity 18 may extend along the cross-vehicle direction D toward the longitudinal axis A. The plurality of sides 48 and the interior side 50 may prevent fluid communication between the sensor cavity 18 and the ambient environment. The sensor cavity 18 may be in fluid communication with the ambient environment through the first opening 20 when the shutter 46 is in the second position. When the shutter 46 is in the first position, the sensor cavity 18 may be sealed from the ambient environment. The sensor cavity 18 lacks fluid communication with the ambient environment when the shutter 46 is in the second position. The plurality of sides 48 and the interior side 50 may be formed of any suitable material, e.g., metal, plastic, etc.

The sensor cavity 18 may be larger than the first opening 20. In other words, the sensor cavity 18 may have a larger cross-sectional area than the first opening 20, as shown in FIG. 4. The sensor cavity 18 may extend any suitable amount in the cross-vehicle direction D, i.e., towards the longitudinal axis A. The sensor cavity 18 may have any suitable shape, e.g., cubical, cylindrical, etc.

The pressure sensor 14 may, for example, collect the pressure data during the vehicle impact, e.g., the side impact. The pressure sensor 14 may be any suitable type of pressure sensor 14 for detecting pressure data during the vehicle impact, e.g., piezoresistive strain gauge, capacitive diaphragm, electromagnetic diaphragm, piezoelectric, optical fiber, potentiometric, resonant, thermal, ionization, etc.

The pressure sensor 14 may be supported by the instrument panel 12 in the sensor cavity 18. For example, the pressure sensor 14 may be attached directly to the sensor cavity 18, e.g., one of the sides 48, as shown in FIG. 4. As another example, the pressure sensor 14 may be attached to the sensor cavity 18 indirectly with an intermediate component, e.g., a bracket. The pressure sensor 14 may be disposed at any suitable position in the sensor cavity 18. For example, the pressure sensor 14 may be supported on any one of the plurality of sides 48 and the interior side 50. As another example, the pressure sensor 14 may be spaced from the first opening 20 by any suitable amount, e.g., along the cross-vehicle direction D. The pressure sensor 14 may be attached to the sensor cavity 18 in any suitable manner, e.g., fasteners, welding, etc.

With reference to FIG. 2, the door opening 28 is disposed between the A-pillar 32 and the B-pillar 34 on each side 36, 38 of the vehicle 10. For example, the vehicle body 26 may include one door opening 28 on one side 36 of the vehicle 10 and another door opening 28 on the other side 38 of the vehicle 10. The vehicle body 26 may include one door 16 disposed in the door opening 28 on each side 36, 38 of the vehicle 10.

The door 16 may extend across the door opening 28 in the closed position, as shown in FIG. 1. In other words, the door 16 may extend from the A-pillar 32 to the B-pillar 34. The door 16 may be hinged to, i.e., rotate about, the A-pillar 32. For example, the door 16 is pivotable about the A-pillar 32 from the closed position, as shown in FIG. 1, to the open position, as shown in FIG. 2.

The door 16 may be removable. In other words, the vehicle 10, e.g., the vehicle body 26 and the door 16, may be designed for the occupant to easily remove and install the door 16 from the vehicle body 26. The occupant may, for example, remove the door 16 from the vehicle body 26, e.g., the A-pillar 32, and operate the vehicle 10 with the door 16 removed. In other words, the vehicle 10, e.g., the vehicle body 26, may satisfy safety requirements such the vehicle 10 may be operated without the door 16 on the vehicle body 26.

The door 16 may be any suitable type of door. For example, the door 16 may be a front driver door, as shown in FIGS. 1 and 2. As another example, the door 16 may be a front passenger door, or any other suitable type of door. The vehicle 10 may include any suitable number of doors 16.

With reference to FIG. 1, the door 16 includes a front side 52 and a rear side 54 spaced from the front side 52. The front side 52 may be disposed adjacent to the A-pillar 32, and the rear side 54 may be disposed adjacent to the B-pillar 34. In other words, the door 16, in the closed position, extends across the door opening 28 from the front side 52 to the rear side 54. The door 16 may include a top side 56 and a bottom side 58 spaced from the top side 56. The top side 56 and the bottom side 58 may each extend from the front side 52 to the rear side 54.

With reference to FIG. 2, the door 16 includes a door inner 60 and a door outer 62 attached to the door inner 60. The door outer 62 is fixed to the door inner 60, e.g., may be flanged to the door inner 60. The door 16 may include a trim panel 64 supported on the door inner 60 and/or the door outer 62. The trim panel 64 is adjacent an occupant of the vehicle 10 and may be formed, for example, of an underlying plastic, foam, etc., covered by leather, vinyl, etc.

With continued reference to FIG. 2, the door inner 60 is disposed between the door outer 62 and the occupant, i.e., on an inboard side of the door 16. The door inner 60 extends from the front side 52 to the rear side 54, and from the top side 56 to the bottom side 58, as shown in FIG. 2. The door inner 60 may include a plurality of holes (not shown) for mounting door 16 components, e.g., the reinforcing beam, a speaker, etc., to the door 16.

The door outer 62 is spaced from the occupant on the door 16, e.g., disposed on an outboard side of the door 16. In other words, as set forth above, the door inner 60 is disposed between the occupant and the door outer 62. The door outer 62 extends from the front side 52 to the rear side 54, and from the top side 56 to the bottom side 58, as shown in FIG. 1. The door outer 62 is fixed to the door inner 60, e.g., by flanging, along the sides 52, 54, 58 of the door 16. Specifically, the door outer 62 may be fixed to the door inner 60 along the front, rear, and bottom sides 52, 54, 58 of the door 16.

The door outer 62 and the trim panel 64 define the door cavity 22 therebetween. In other words, the trim panel 64 may be spaced from the door inner 60 between the sides 52, 54, 56, 58 of the door 16.

The door 16 and the vehicle body 26 may include locking elements releasably engageable with each other. The locking elements may include a striker (not numbered) disposed on one of the door 16 and the vehicle body 26 and a door latch 68 releasably engageable with the striker disposed on the other of the door 16 and the vehicle body 26. The door latch 68 may be engageable between a locked position, in which the striker is engaged with the door latch 68, and an unlocked position, in which the striker is disengaged with the door latch 68. In the locked position, the door latch 68 prevents the door 16 from pivoting from the closed position to the open position. In the unlocked position, the door latch 68 allows the door 16 to pivot relative to the vehicle body 26, e.g., the A-pillar 32. When the door 16 is in the closed position, the door latch 68 may be designed to receive the striker. In other words, the door latch 68 may be sized, shaped, and positioned to receive the striker when the door 16 is in the closed position.

For purposes of this disclosure, "closed position" means when the door 16 is hinged to the vehicle body 26 and the door latch 68 is engaged with the striker, i.e., the locking elements are in the locked position. "Open position" means when the door latch 68 is disengaged from the striker, i.e., the locking elements are in the unlocked position. For example, the open position may include the door latch 68 disengaged from the striker when the door 16 is hinged to the A-pillar 32. As another example, the open position may include the door latch 68 disengaged from the striker when the door 16 is removed, i.e., unhinged, from the vehicle body 26, e.g., the A-pillar 32.

Figure 3:
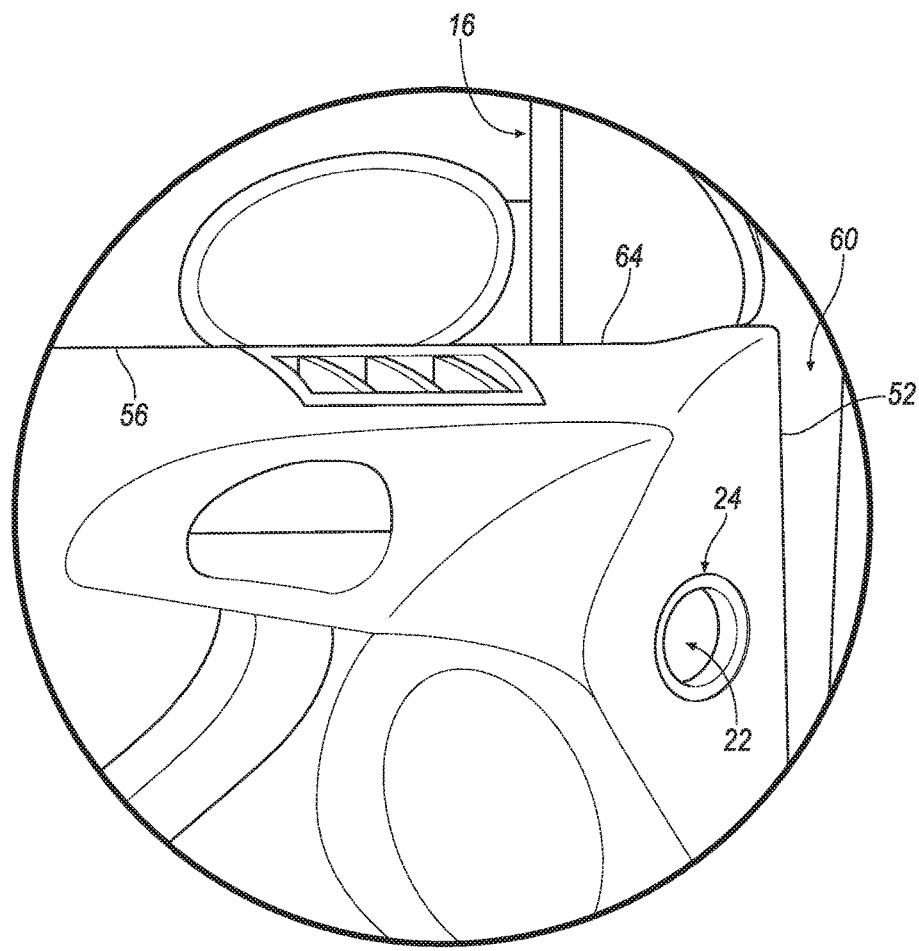
FIG. 3 is a perspective view of the door and showing a second opening.

The second opening 24 may be disposed on the door inner 60. For example, the second opening 24 may extend through the door inner 60 to the door cavity 22. Specifically, the second opening 24 may extend through the door inner 60 and the trim panel 64 to the door cavity 22, as shown in FIG. 3. The second opening 24 may have a same or different shape as the first opening 20. The second opening 24 may be any suitable shape, e.g., circular, rectangular, etc. The second opening 24 may have a same or different size as the first opening 20. The second opening 24 may have any suitable size, i.e., cross-sectional area. In other words, the second opening 24 may extend transverse to the cross-vehicle direction D any suitable amount along the door inner 60.

When the door 16 is in the open position, the first opening 20 and the second opening 24 are disengaged from each other. For example, the first opening 20 and the second opening 24 are spaced from each other, as shown in FIG. 2. In this situation, the door cavity 22 may be in fluid communication with the ambient environment through the second opening 24, and the shutter 46 may prevent fluid communication with the sensor cavity 18, i.e., the shutter 46 may be in the first position. Alternatively, each of the sensor cavity 18 and the door cavity 22 may be in fluid communication with the ambient environment through the first and second openings 20, 24, respectively. When the door 16 is in the closed position, the first and second openings 20, 24 may be engaged with each other. In other words, the first opening 20 may be in fluid communication with the second opening 24, as shown in FIG. 1. In this situation, the sensor cavity 18 may in fluid communication with the door cavity 22 through the first and second openings 20, 24, i.e., the shutter 46 may be in the second position. Alternatively, the shutter 46 may be in the first position when the door 16 is in the closed position such that the shutter 46 prevents fluid communication between the sensor cavity 18 and the door cavity 22.

The vehicle 10 may include a seal 66 attached to one of the first opening 20 and the second opening 24. For example, the seal 66 may be attached adjacent to one of the first opening 20 and the second opening 24, e.g., on one of the end cap 44 and trim panel 64, respectively. As another example, the seal 66 may extend internally around one of the first opening 20 and the second opening 24. The seal 66 may extend outwardly from one of the first opening 20 and the second opening 24 toward the other of the first opening 20 and the second opening 24, as shown in FIG. 2. The seal 66 may be attached to one of the first opening 20 and the second opening 24 in any suitable way, e.g., adhesive, press fit, etc.

The seal 66 may be engageable with the other of the first opening 20 and the second opening 24. For example, when the door 16 is in the closed position, the seal 66 may be engaged with the other of the first opening 20 and the second opening 24. As shown in FIG. 2, the seal 66 may be attached to the first opening 20 and engageable with the second opening 24. In this situation, the seal 66 may be sandwiched between the instrument panel 12, e.g., the end cap 44, and the door 16, e.g., the trim panel 64. The seal 66 may extend annularly about each of the first opening 20 and the second opening 24 when the door 16 is in the closed position.

The seal 66 may allow fluid communication through each of the first opening 20 and the second opening 24. In other words, the seal 66 may allow fluid communication between the door cavity 22 and the sensor cavity 18. The seal 66 may prevent or reduce fluid communication between the first and second openings 20, 24 with the ambient environment, i.e., the seal 66 may prevent or reduce a leak from between the first and second openings 20, 24 when the door 16 is in the closed position.

The vehicle 10 may include an airbag assembly (not shown) having an airbag, i.e., a side airbag, inflatable to an inflated position. The roof 30 may support the airbag assembly, and specifically, may support the airbag when the airbag is in the inflated position. The airbag assembly may be mounted to the roof 30 in any suitable manner, e.g., fasteners, welding, etc.

The airbag may extend along one side 36 of the vehicle 10, e.g., the roof 30, in an uninflated position. For example, the airbag may be elongated along the longitudinal axis A. In the inflated position, the airbag may, for example, extend across the door opening 28, e.g., from the A-pillar 32 to the B-pillar 34. The airbag may be disposed between the occupant and the door 16 in the inflated position. The vehicle 10 may include any suitable number of airbags.

The airbag may be formed of any suitable type of material, e.g., from a woven polymer. For example, the airbag may be formed of woven nylon yarn, e.g., nylon 6. Other suitable exampled include polyether ether ketone (PEEK), polyetherketoneketone (PEKK), polyester, or any other suitable polymer. The woven polymer may include a coating such as silicone, neoprene, urethane, polyorganosiloxane, etc.

The airbag assembly may include an inflator 70 in fluid communication with the airbag that inflates the airbag from the uninflated position to the inflated position. The inflator 70 expands the airbag with an inflation medium, such as a gas, to move the airbag from the uninflated position to the inflated position.

The inflator 70 may be, for example, a pyrotechnic inflator that uses a chemical reaction to drive the inflation medium into the airbag. Alternatively, the inflator 70 may be, for example, a cold-gas inflator that, when activated, ignites a pyrotechnic charge that creates an opening for releasing the pressurized inflation medium to the airbag via a fill tube (not shown). Alternatively, the inflator 70 may be of any suitable type, for example, a hybrid inflator.

The vehicle 10 may include one or more secondary sensors 72 programmed to detect the vehicle impact to the vehicle 10. The secondary sensors 72 may be disposed at various locations in or on the vehicle 10. The secondary sensors 72 may be of various types, e.g., pressure sensor 14, acceleration sensor, vision sensor, etc.

The vehicle 10 may include a controller 74. The controller 74 is a microprocessor-based controller. The controller 74 includes a processor, memory, etc. The memory of the controller 74 includes memory for storing instructions executable by the processor as well as for electronically storing data and/or databases.

The controller 74 may transmit and receive data through a communications network 76 such as a controller area network (CAN) bus, Ethernet, WiFi, Local Interconnect Network (LIN), onboard diagnostics connector (OBD-II), and/or by any other wired or wireless communications network. The controller 74 may be in communication with various components via the communications network 76.

Figure 7:
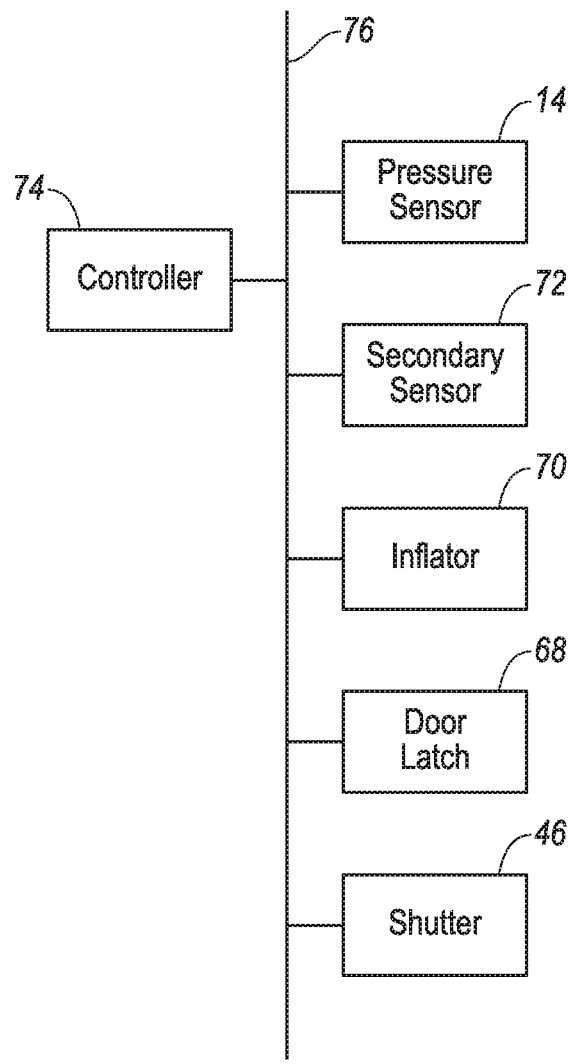
FIG. 7 is a block diagram of a control network for the vehicle.

The controller 74 may, for example, be in communication with each door latch 68, as shown in FIG. 7. For example, the controller 74 may determine the door 16 is in the open position when the door latch 68 is disengaged from the striker, i.e., in the unlocked position. The controller 74 may determine the door 16 is in the closed position when the door latch 68 is engaged with the striker, i.e., in the locked position.

The controller 74 may, for example, be in communication with the shutter 46, as shown in FIG. 7. The controller 74 may send a signal to move the shutter 46 in response to the door 16 moving between the open position and the closed position. For example, the controller 74 may actuate the motor of the shutter 46 to move the shutter 46 from the first position, i.e., the first opening 20 is sealed from the environment, to the second position, i.e., the sensor cavity 18 is in fluid communication through the first opening 20 when the door 16 moves from the open position to the closed position. Alternatively, the controller 74 may instruct the shutter 46 to remain in the first position when the door 16 is in the closed position. When the door 16 moves from the closed position to the open position, the controller 74 may actuate the motor of the shutter 46 to move the shutter 46 from the second position to the first position to prevent or reduce water, debris, or other contaminants from entering the sensor cavity 18 through the first opening 20.

The controller 74 may, for example, be in communication with both the pressure sensor 14 and the secondary sensor 72, as shown in FIG. 7. When the vehicle impact occurs, the controller 74 may receive one or more signals from one or both of the pressure sensor 14 and the secondary sensor 72. In response to receiving the signals from one or both of the pressure sensor 14 and the secondary sensor 72, the controller 74 may initiate the inflation of the airbag. Alternatively, the controller 74 may initiate the inflation of the airbag selectively based on information from one or both of the pressure sensor 14 and the secondary sensor 72 identifying the physical characteristics of the vehicle impact, e.g., which side of the vehicle impacted, amount of pressure applied to the vehicle 10, etc. and also seat occupancy information, e.g., by using the occupancy sensors disposed inside the seats sensing the occupancy status of the seats.

The controller 74 may disable the pressure sensor 14 based on one of the position of the door 16 and the position of the shutter 46. For example, when the controller 74 determines the door 16 is in the open position, the controller 74 disables the pressure sensor 14. In other words, when the controller 74 determines the door latch 68 is disengaged with the striker and/or the door 16 is removed from the vehicle 10, the controller 74 disables the pressure sensor 14. When the controller 74 determines the door 16 is in the closed position, the controller 74 enables the pressure sensor 14. As another example, when the controller 74 instructs the shutter 46 to move to the first position, the controller 74 may disable the pressure sensor 14. In this situation, when the controller 74 instructs the shutter 46 to move to the second position, the controller 74 may enable the pressure sensor 14.

When the pressure sensor 14 is enabled the controller 74 may receive one or more signals from both the pressure sensor 14 and the secondary sensor 72. In this situation, the controller 74 may, for example, detect the vehicle impact as a result of the signals received from the pressure sensor 14. In other words, the controller 74 may prioritize the signals received from the pressure sensor 14 over the signals received from the secondary sensor 72 when pressure sensor 14 is enabled. Alternatively, the controller 74 may detect the vehicle impact, e.g., the side impact, as a result of the signals received from both the pressure sensor 14 and the secondary sensor 72. When the pressure sensor 14 is disabled the controller 74 may detect the vehicle impact as a result of the signal received from the secondary sensor 72.

The controller 74 may be in communication with the inflator 70, as shown in FIG. 7. For example, the controller 74 may send a signal to the inflator 70 to inflate the airbag to the inflated position in response to a signal from the pressure sensor indicating a vehicle side impact when the door 16 is in the closed position. As another example, the controller 74 may send a signal to the inflator 70 to inflate the airbag to the inflated position in response to a signal from the secondary sensor 72 when the door 16 is in the open position, e.g., removed from the vehicle 10.

Figure 8:
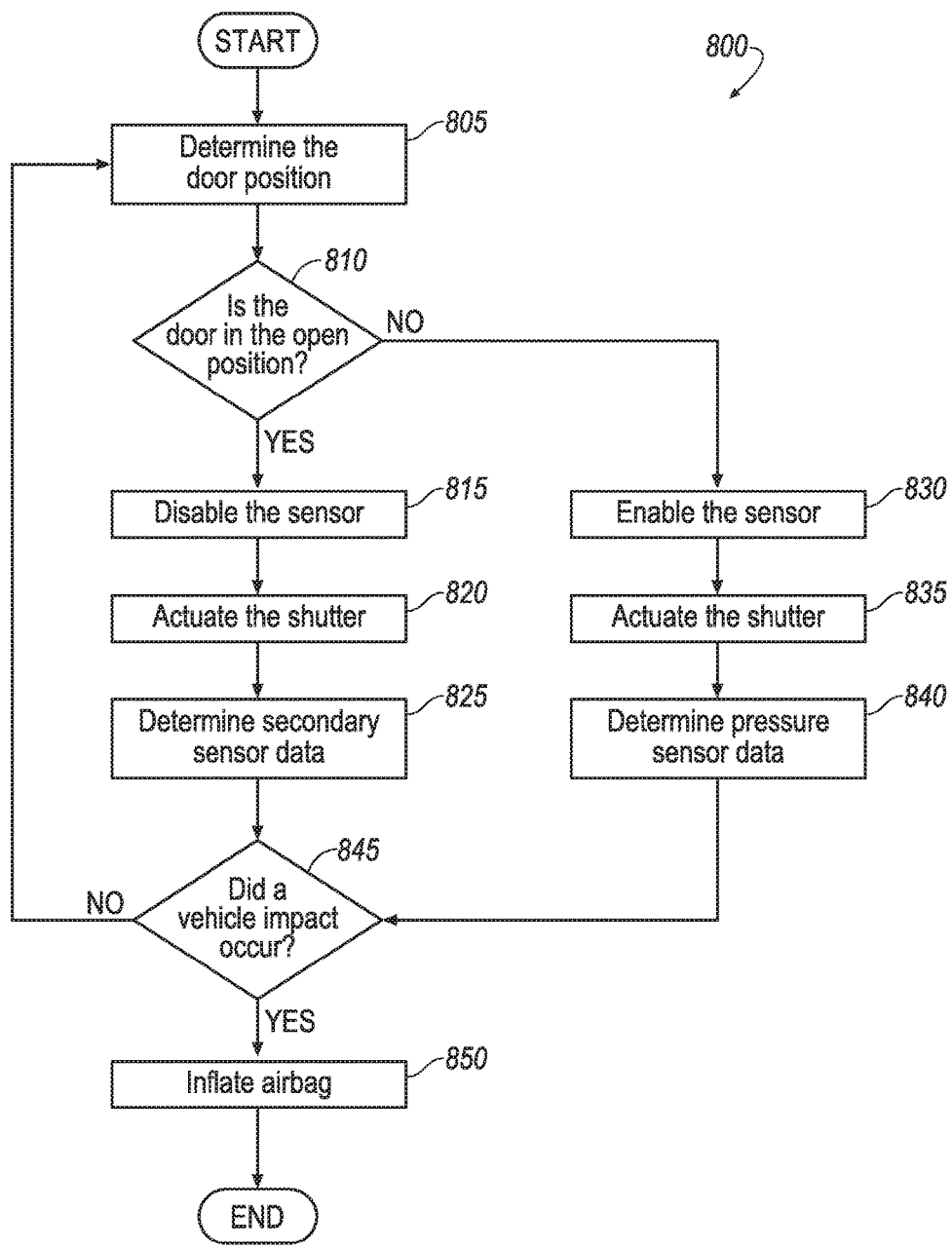
FIG. 8 is a flow diagram of an example process for disabling the pressure sensor.

FIG. 8 is a flow diagram illustrating an exemplary process 600 for disabling the pressure sensor 14 in the sensor cavity 18. In general, as described in more detail below, the controller 74 is programmed to disable the pressure sensor 14 when the door 16 is in the open position, i.e., the door latch 68 is disengaged from the striker. When the pressure sensor 14 is disabled, the controller 74 determines a vehicle impact, e.g., a side impact, as a result of one or more signals from the secondary sensor 72. The memory of the controller 74 stores executable instructions for performing the steps of the process.

The process 600 begins in a block 605, in which the controller 74 receives data from the door latch 68 indicating the position of the door 16. The data may indicate the position of the door 16 based on a position of a switch, a voltage reading, etc.

Next, in a decision block 610, the controller 74 determines whether the door 16 is in the open position, e.g., the door latch 68 is disengaged with the striker. As set forth above, the open position includes the door 16 being removed from the vehicle body 26. If the door 16 is in the open position, the process continues to a block 615. If the door 16 is in the closed position, e.g., installed on the vehicle body 26 and the door latch 68 is engaged with the striker in the locked position, the process continues to a block 630.

Next, in a block 615, the controller 74 disables the pressure sensor 14. The controller 74 sends a signal preventing the pressure sensor 14 from collecting pressure data. For example, the controller 74 may terminate the power supply to the pressure sensor 14, i.e., turn the pressure sensor 14 "off."

Next, in a block 620, the controller 74 activates the shutter 46. The controller 74 instructs the motor of the shutter 46 to move the shutter 46 to the first position as a result of determining the door 16 is in the open position. If the shutter 46 was already in the first position, the controller 74 instructs the motor to retain the shutter 46 in the first position. As set forth above, when the shutter 46 is in the first position, the shutter 46 prevents contaminants from entering the sensor cavity 18.

Next in a block 625, the controller 74 receives data from the secondary sensor 72. The controller 74 may receive one or more signals from the secondary sensor 72. The data may indicate the vehicle impact based on image data, a voltage reading, pressure data, etc.

In the block 630, the controller 74 enables the pressure sensor 14. The controller 74 may enable the pressure sensor 14 as a result of determining the door 16 is installed on the vehicle 10 and in the closed position. The controller 74 sends a signal instructing the pressure sensor 14 to collect pressure data. In other words, the controller 74 turns the pressure sensor 14 "on."

Next, in a block 635, the controller 74 activates the shutter 46. The controller 74 instructs the motor of the shutter 46 to move the shutter 46 to the second position as a result of determining the door 16 is in the closed position. If the shutter 46 was already in the second position, the controller 74 instructs the motor to retain the shutter 46 in the second position. As set forth above, when the shutter 46 is in the second position, the shutter 46 allows fluid communication to the sensor cavity 18 through the first opening 20.

Next in a block 640, the controller 74 receives data from the pressure sensor 14 indicating the vehicle impact. The data from the pressure sensor 14 may indicate the vehicle impact based on pressure pulses transferred from the door cavity 22 through the first and second openings 20, 24 to the sensor cavity 18. Additionally, the controller 74 may receive data from the secondary sensor 72. The data from the secondary sensor 72 may indicate the vehicle impact as described above in the block 625. The process continues in the block 645.

In the decision block 645, the controller 74 determines whether the vehicle impact occurred. If the vehicle impact occurred, the process continues to a block 635. Otherwise, the process returns to the block 605.

Next, in a block 650, the controller 74 initiates inflation of the airbag. The controller 74 may send a signal to the inflator 70 to inflate the airbag. The inflator 70 may inflate the airbag with the inflation medium, as set forth above. When the airbag is inflated, the process ends.

The controller 74 may employ any of a number of computer operating systems, including, but by no means limited to, versions and/or varieties of the Ford SYNC® application, AppLink/Smart Device Link middleware, the MICROSOFT® Automotive operating system, the Microsoft WINDOWS® operating system, the Unix operating system (e.g., the SOLARIS® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems.

Computer-executable instructions stored on the memory, as set forth above, may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (which may also be referred to as a processor-readable medium) includes any non-transitory (e.g., tangible) medium that participates in providing data (e.g., instructions) that may be read by the controller 74 (e.g., by the processor of the controller 74). Such a medium may take many forms, including, but not limited to, non-volatile media and volatile media. Non-volatile media may include, for example, optical or magnetic disks and other persistent memory. Volatile media may include, for example, dynamic random access memory (DRAM), which constitutes a main memory. Such instructions may be transmitted by one or more transmission media, including coaxial cables, copper wire and fiber optics, including the wires that comprise a system bus coupled to the processor of the computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is included within a computing device employing a computer operating system such as one of those mentioned above, and are accessed via a network in any one or more of a variety of manners. A file system may be accessible from a computer operating system, and may include files stored in various formats. An RDBMS employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a controller
an instrument panel defining a sensor cavity and a first opening in fluid communication with the sensor cavity;
a pressure sensor in the sensor cavity and in communication with the controller;
a door defining a door cavity and a second opening in fluid communication with the door cavity;
the door being moveable between an open position and a closed position, the first and second openings being engaged with each other in the closed position and disengaged with each other in the open position.

2. The vehicle of claim 1, wherein the sensor cavity is sealed except at the first opening.

3. The vehicle in claim 1, wherein the sensor cavity is in fluid communication with the door cavity through the first and second openings when the door is in the closed position.

4. The vehicle of claim 1, further comprising a seal engaged with each of the first and second openings when the door is in the closed position, the seal extending annularly about each of the first and the second openings.

5. The vehicle of claim 4, wherein the seal is sandwiched between the instrument panel and the door when the door is in the closed position.

6. The vehicle of claim 1, wherein the first opening includes a shutter moveable between a first position and a second position, the shutter extending entirely across the first opening in the first position.

7. The vehicle of claim 6, wherein the shutter prevents fluid communication with sensor cavity through the first opening when the shutter is in the first position.

8. The vehicle of claim 6, wherein the shutter allows fluid communication with the sensor cavity through the first opening when the shutter is in the second position.

9. The vehicle of claim 1, wherein the controller is programmed to disable of the pressure sensor when the door is in the open position.

10. The vehicle of claim 9, further comprising an airbag inflatable to an inflated position, the controller is further programmed to inflate the airbag to the inflated position in response to a signal from the pressure sensor indicating a vehicle side impact when the door is in the closed position.

11. The vehicle of claim 9, wherein the first opening includes a shutter moveable between a first position and a second position, the controller is further programmed to move the shutter in response to the door moving between the open position and the closed position.

12. The vehicle of claim 1, wherein the door is removable.

13. The vehicle of claim 12, wherein the controller is programmed to disable of the pressure sensor when the door is removed.

14. The vehicle of claim 13, further comprising an airbag inflatable to an inflated position, the controller is further programmed to inflate the airbag to the inflated position in response to a signal from a secondary sensor indicating a vehicle side impact when the door is removed.

15. The vehicle of claim 13, wherein the first opening includes a shutter moveable between a first position and a second position, the controller is further programmed to move the shutter in response to the door moving between the open position and the closed position.

16. A system comprising a processor and a memory storing instructions executable by the processor to:
determine that a door of a vehicle is in an open position;
disable a pressure sensor in an instrument panel of the vehicle as a result of determining that the door is in the open position;
determine that the door of the vehicle is in a closed position; and
enable the pressure sensor in the instrument panel of the vehicle as a result of determining that the door is in the closed position.

17. The system of claim 16, further comprising moving a shutter to a first position as a result of determining the door is in the open position.

18. The system of claim 17, further comprising moving the shutter to a second position as a result of determining the door is in a closed position.

19. The system of claim 16, wherein the door is removeable, and further comprising disabling the pressure sensor as a result of determining the door is removed from the vehicle.

20. The system of claim 19, further comprising enabling the pressure sensor as a result of determining the door is installed on the vehicle and in a closed position.

* * * * *